United States Patent [19]

Hong

[11] Patent Number: 5,610,597
[45] Date of Patent: Mar. 11, 1997

[54] MODE DISCRIMINATING DEVICE FOR AN IMAGE SIGNAL PROCESSING SYSTEM

[75] Inventor: Sang-Beom Hong, Jeju-do, Rep. of Korea

[73] Assignee: Samsung Electronics Co., Ltd., Kyungki-do, Rep. of Korea

[21] Appl. No.: 1,650

[22] Filed: Jan. 7, 1993

[30] Foreign Application Priority Data

Jan. 7, 1992 [KR] Rep. of Korea ............................. 92-92

[51] Int. Cl.$^6$ ...................................................... H04Q 1/00
[52] U.S. Cl. ...................................................... 340/825.78
[58] Field of Search ........................ 340/825.78, 825.77, 340/815.61; 341/35, 192; 360/74.1; 318/578; 8/59; 345/184

[56] References Cited

U.S. PATENT DOCUMENTS

| | | | |
|---|---|---|---|
| 2,400,259 | 5/1946 | Place | 340/825.78 |
| 3,846,838 | 11/1974 | Okamoto et al. | 340/825.61 |
| 4,284,972 | 8/1981 | Chiu et al. | 338/127 |
| 4,420,669 | 12/1983 | Scalf et al. | 341/35 |
| 4,420,779 | 12/1983 | Takano et al. | 360/92 |
| 4,951,163 | 8/1990 | Nakamichi | 360/85 |
| 4,977,467 | 12/1990 | Kondo | 360/74.1 |
| 5,061,848 | 10/1991 | Choi | 250/229 |
| 5,113,124 | 5/1992 | Hamilton | 318/578 |
| 5,150,489 | 9/1992 | Kaji et al. | 8/159 |

*Primary Examiner*—Edwin C. Holloway, III
*Attorney, Agent, or Firm*—Sughrue, Mion, Zinn, Macpeak & Seas

[57] ABSTRACT

A mode discriminating device for an image signal processing system for discriminating between various operating modes of the image signal processing system. The mode discriminating device includes a microcomputer, a cam switch having a connecting element, and a voltage divider having an output terminal coupled to an input of the microcomputer. The voltage divider is composed of impedance elements and connecting taps, and is arranged at a position opposed to the connecting element. The connecting element makes simultaneous contact with the one of connecting taps and the output terminal according to the rotation of the cam switch. The output terminal supplies a corresponding voltage to the microcomputer which, by comparing the output voltage to reference data, discriminates between various operating modes of the system.

11 Claims, 4 Drawing Sheets

MODE DISCRIMINATING DEVICE FOR AN IMAGE SIGNAL PROCESSING SYSTEM

BACKGROUND OF THE INVENTION

The present invention relates, in general, to an image signal processing system for recording or reading an image signal to or from a storage medium and, more particularly, to an image signal processing system having a mode discriminating device for determining the present mode of the system. The mode discriminating device includes a cam switch and connecting element formed in association with a voltage divider, which divides a power supply voltage according to the position of the connecting element and outputs a signal whose voltage value is indicative of the present mode of the system.

A conventional mode discriminating device, which is often used in an image signal processing system, includes several mode discriminating ports arranged at predetermined positions of a cam switch in accordance with different modes of the system. In such a device, the modes of the system are discriminated on the basis of electrical signals produced at the mode discrimination ports by a rotating cam switch.

For example, assuming that three mode discriminating ports are provided in the cam switch, if the electrical signals produced at the mode discriminating ports are at a high, high, and low level, respectively, then a first mode (e.g., stop) is discriminated. On the other hand, if the signals are at a logic low, high, and low level, respectively, then a second mode (e.g., play) is discriminated.

A mode discriminating technique as described above is disclosed in U.S. Pat. No. 5,061,848, entitled "NON-CONTACTING ROTARY TYPE MODE SWITCH FOR MAGNETIC TAPE RECORDING DEVICE", in which a non-contacting rotary type mode switch having several reflecting pieces and light reflecting sensors is employed to discriminate the current mode of the system. That is, each of reflecting pieces is formed on a corresponding one of multiple concentric tracks which are defined on a back surface of a mode switch gear, and the light reflecting sensors are formed on an upper surface of the switch body to read the rotating mode of a cam gear. The system includes a means for emitting light and light receiving means for detecting the light reflected from the reflecting pieces.

However, in a conventional mode discriminator, which employs mode discriminating ports, the ports must be contacted correctly with high mechanical accuracy. Further, even if a microcomputer is employed to recognize data produced from the mode discriminating ports, erroneous data recognition will occur. Moreover, the construction of the device is quite complicated like, for example, the device described in the aforementioned U.S. Pat. No. 5,061,848.

SUMMARY OF THE INVENTION

Accordingly, an object of the present invention is to provide a mode discriminating device for an image processing system in which a single mode discriminating port provides a voltage level which changes upon the rotation of a cam switch to discriminate between different modes of the system, and which overcomes the disadvantages and problems associated with conventional devices.

The above and other objects of the present invention are accomplished by providing a mode discriminating device for an image signal processing system which has at least two modes of operation, which includes a power source for providing a supply voltage, a cam switch having a connecting element which are selectively rotatable to one of a predetermined number of positions, a voltage divider having an input terminal coupled to the supply voltage for producing an output voltage corresponding to the supply voltage divided by a predetermined impedance, the predetermined impedance corresponding to the position of the cam switch and connecting element, and a microcomputer, coupled to an output terminal of the voltage divider for receiving the output voltage, for discriminating between the modes of the image signal processing system on the basis of the received output voltage.

The above object and advantages will become more apparent from the following specification taken in connection with the accompanying drawings.

DETAILED DESCRIPTION OF THE PREFERRED EMBODIMENT

Figure 1:
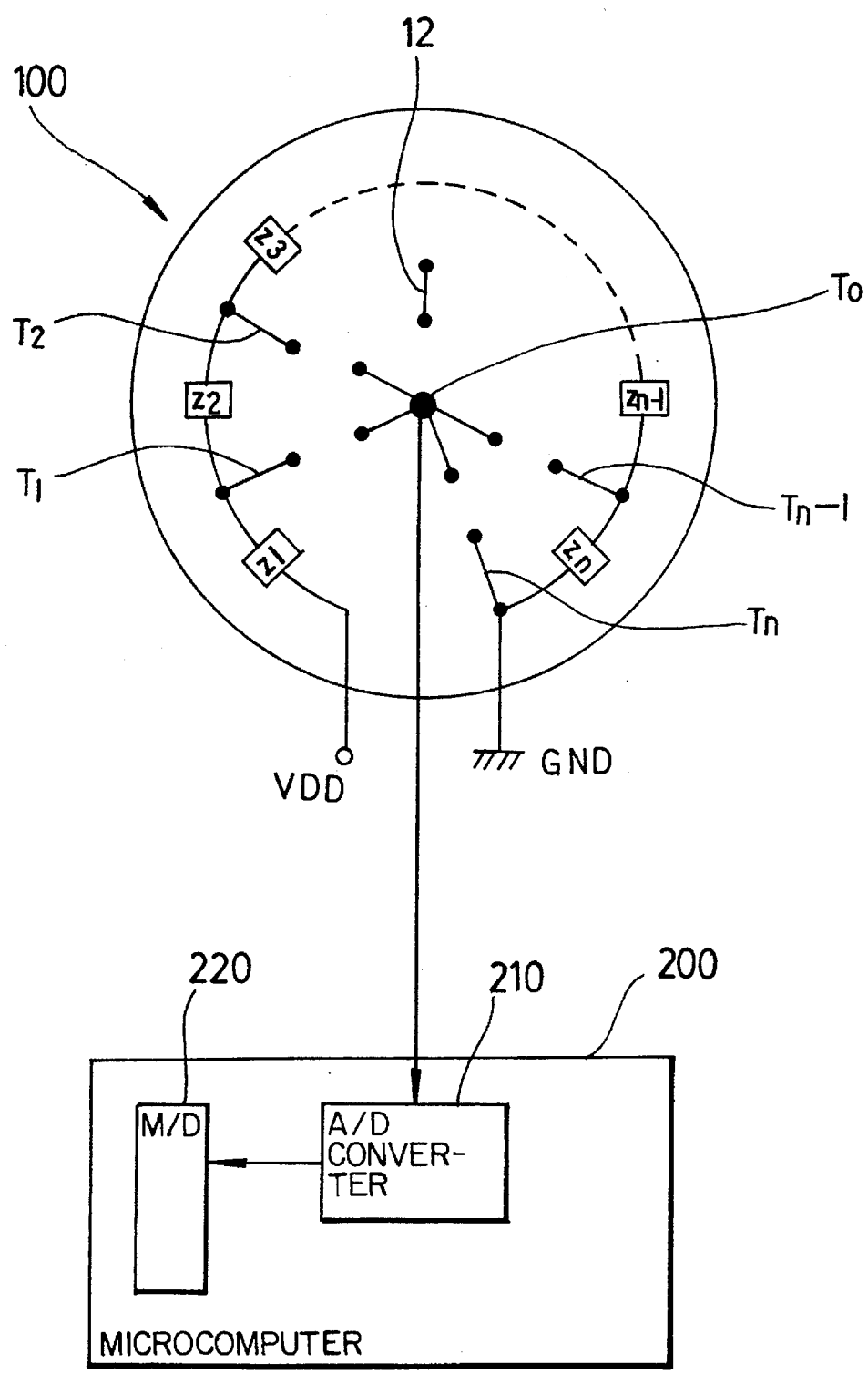
FIG. 1 illustrates a mode discriminating device for an image signal processing system according to the present invention.

Referring to FIG. 1, there is shown a mode discriminating device for an image signal processing system according to the present invention. The mode discriminating device includes a microcomputer 200, a cam switch 100 having a connecting element 12, and a voltage divider having an output terminal $T_0$ coupled to an input of the microcomputer 200.

The voltage divider is composed of a plurality of impedance elements $Z_1$ to $Z_n$ and a plurality of connecting taps $T_1$ to $T_n$, and is arranged at a position opposed to the connector 12 on cam 101, which is formed within the cam switch 100. The connecting element 12 is of a predetermined length which permits it to make simultaneous contact with one of the connecting taps $T_1$ to $T_n$ and the output terminal $T_0$. As will be described below in more detail, upon rotation of the cam switch 100, the connecting element 12 makes electrical contact between one of the connecting taps $T_1$ to $T_n$ and the output terminal $T_0$.

A power voltage $V_{DD}$ is applied to an input terminal of the voltage divider such that an output voltage, which equals the power voltage $V_{DD}$ divided by a combination of the impedance elements $Z_1$ to $Z_n$, is produced to the output terminal $T_0$ through the connecting element 12 and the connecting taps $T_1$ to $T_n$.

According to a preferred embodiment, the connecting element 12 is formed of a resilient material which provides an excellent electrical contact with the connecting taps $T_1$ to $T_n$ and the output terminal $T_0$. In addition, the resilient material prevents abrasion from occurring due to mechanical rubbing of the connecting element 12 with the taps $T_1$ to $T_n$ and the output terminal $T_0$.

The microcomputer 200 includes an analog to digital converter ("A/D converter") 210, which is coupled to the output terminal $T_0$, for converting the divided output voltage of the voltage divider into a digital signal. The digital signal is then applied to a mode discriminator 220 which discriminates the present mode of the image signal processing system on the basis of the voltage digitally converted by the A/D converter 210.

In operation, a loading motor (not shown) is energized so as to rotate the cam switch 100 and the connecting element 12. Thus, the combination of the rotating cam switch and connecting element 12 with the voltage divider enables selective connection between the connecting element 12 and one of the connecting taps $T_1$ to $T_n$ to provide an output voltage at the output terminal $T_0$. Upon the selective connection of one of the connecting taps $T_1$ to $T_n$ to the output terminal $T_0$ through the connecting element 12, a voltage divided by the respective impedance elements $Z_1$ to $Z_n$ is output from the one connecting tap to the output terminal $T_0$.

The output voltage is thus supplied to the A/D converter 210 of the microcomputer 200, which converts the output voltage into a digital signal. The digitally converted voltage is then input to the mode discriminator 220 which discriminates a mode of the system on the basis of the voltage value.

Figure 2:
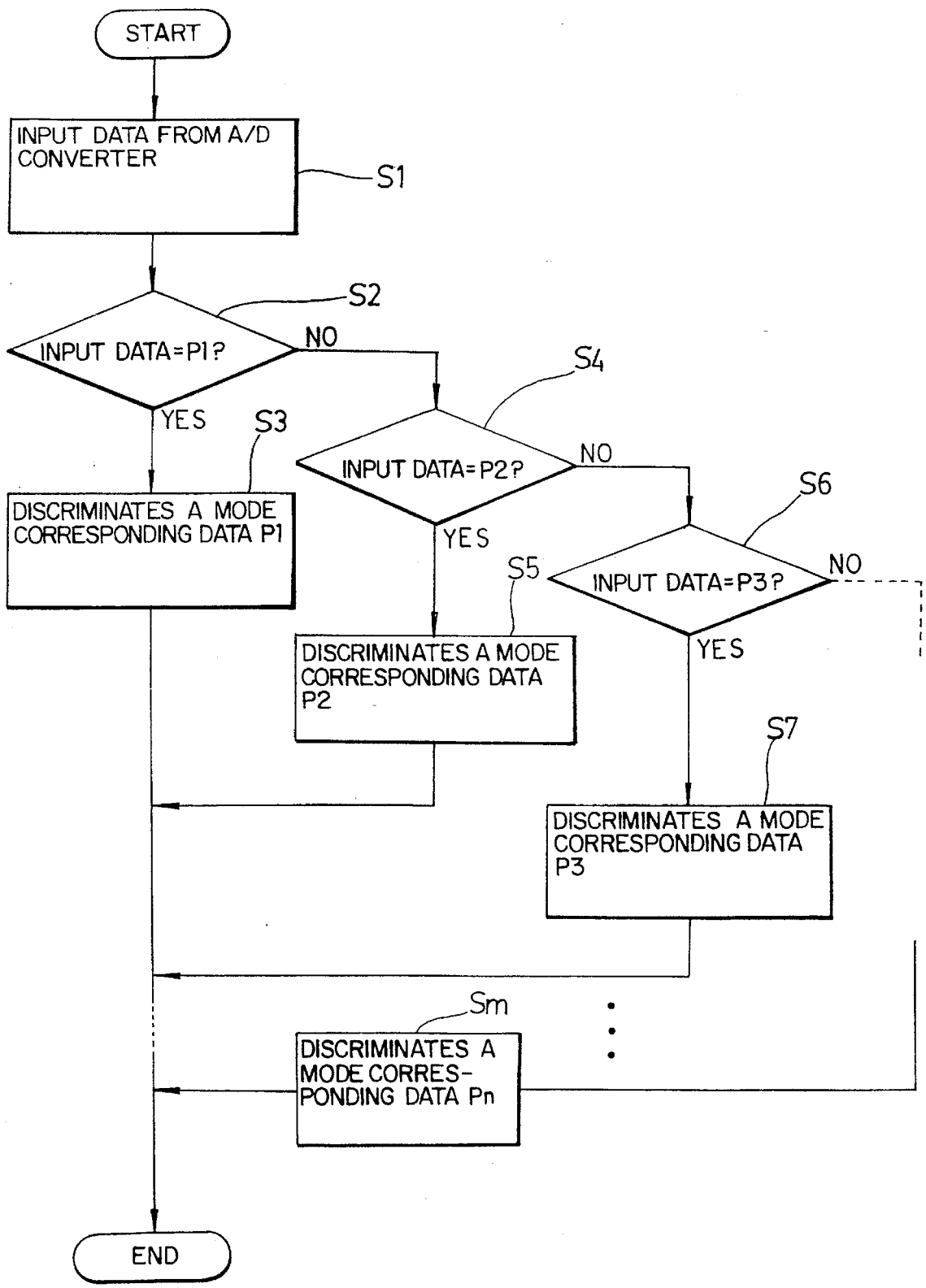
FIG. 2 is a flowchart illustrating the operational sequence of a microcomputer of FIG. 1.
Figure 3:
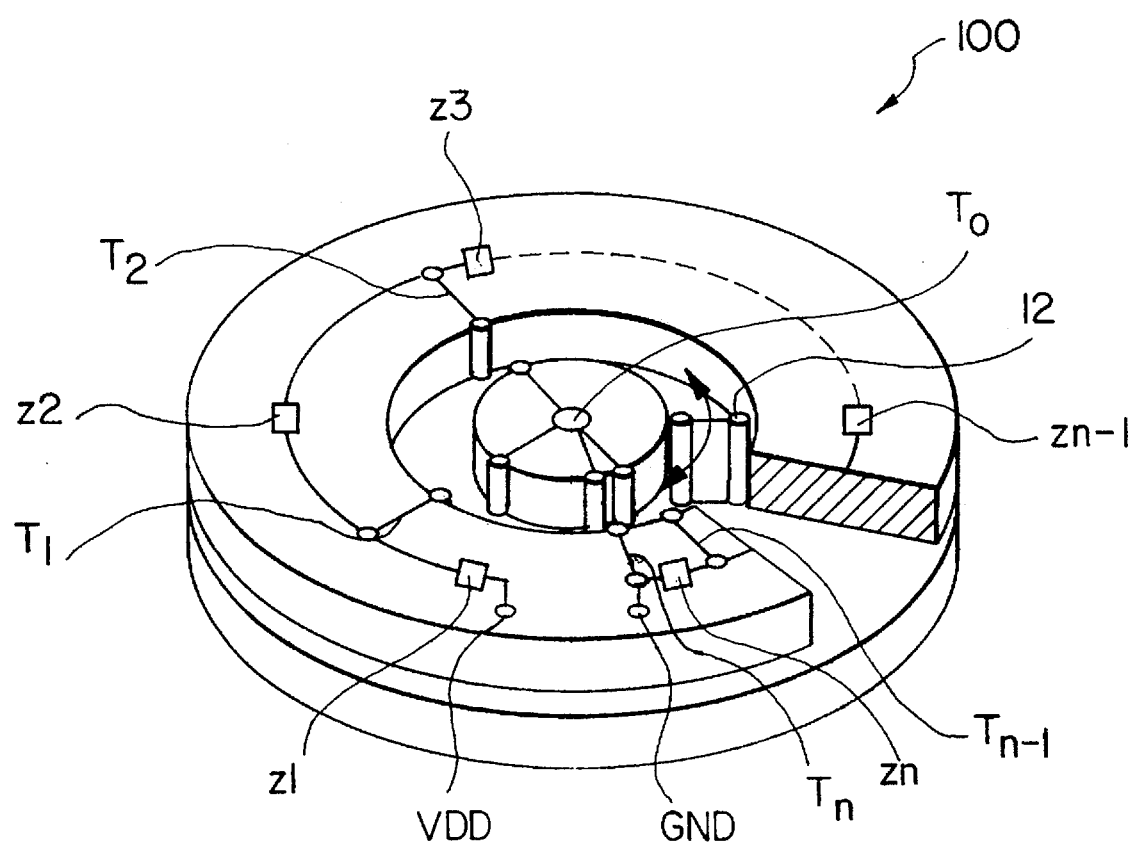
FIG. 3 is an isometric view of cam switch 100 of FIG. 1.
Figure 4:
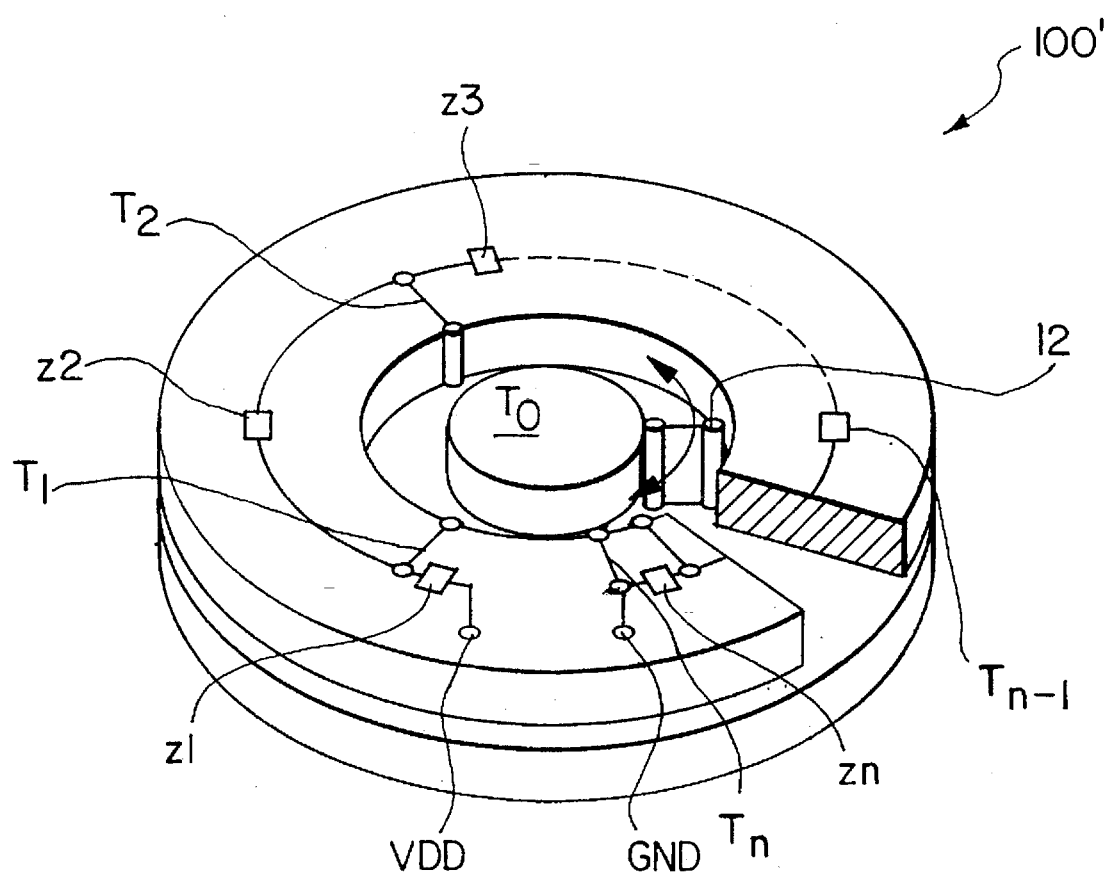
FIG. 4 illustrates an alternative preferred embodiment of the cam switch of FIG. 3.

The operation of the microcomputer will be described in more detail with reference to the flowchart of FIG. 2.

Beginning with step $S_1$, the output voltage from the voltage divider is input to the A/D converter 210 and supplied to the mode discriminator 220. The digitally converted data is compared with a first predetermined value $P_1$ in step $S_2$. The first predetermined value $P_1$ is representative of a first mode (e.g., stop) of the system and corresponds to the voltage $V_1$ output when the connecting element 12 is connected between the first connecting tap $T_1$ and the output terminal $T_0$. The voltage $V_1$ of the output terminal $T_0$ is expressed as follows.

$$V_1 = \frac{Z_2 + Z_3 + \ldots + Z_n}{Z_1 + Z_2 + \ldots + Zn} \cdot V_{DD} \tag{1}$$

The mode discriminator 220 compares the digitally converted output voltage $V_1$ with the predetermined or reference value $P_1$. If the digitally converted output voltage $V_1$ is identical to the data $P_1$, which corresponds to a first mode, the process proceeds to Step $S_3$ wherein the mode discriminator 220 determines that the system is set to a first mode of operation.

Otherwise, if the input data does not equal the reference value $P_1$, the process advances to step $S_4$ wherein the digitally converted voltage is compared to a second reference or predetermined value $P_2$, which corresponds to a second mode (e.g., playback). The value $P_2$ corresponds to the output voltage when the connecting element 12 is connected between the connecting tap $T_2$ and the output terminal $T_0$. Here, the output terminal $T_0$ will output an output voltage $V_2$ expressed by the following equation:

$$V_2 = \frac{Z_3 + Z_4 + \ldots + Z_n}{Z_1 + Z_2 + \ldots + Zn} \cdot V_{DD} \tag{2}$$

As described above, the output voltage expressed by equation (2) is applied through the output terminal $T_0$ to the A/D converter 210 in the microcomputer 200 which converts the voltage $V_2$ into a corresponding digital signal. In step $S_4$, the mode discriminator 220 compares the digital signal with the reference data $P_2$. If the digital signal is identical to the value $P_2$, the mode discriminator 220 then determines in step $S_5$ that the system has been set to the second mode (e.g., playback) of operation.

When the system is set to a third mode (e.g., Fast Forward), the connecting tap $T_3$ is connected to the output terminal $T_0$ by the connecting element 12. At this stage, the output voltage $V_3$ at the output terminal $T_0$ is expressed as follows:

$$V_3 = \frac{Z_4 + \ldots + Z_n}{Z_1 + Z_2 + \ldots + Zn} \cdot V_{DD} \tag{3}$$

In step $S_6$, the mode discriminator determines whether the digitally converted output voltage $V_3$ equals a third reference value $P_3$. If the digitally converted voltage $V_3$ is identical to the value $P_3$, the mode discriminator 220 determines that the system is set to a third mode of operation (step $S_7$).

As described above, when an image processing system has several modes of operation (generally, the image signal processing system can be set to six to eight modes), a voltage divider having connectors $T_1$ to $T_n$ can be used to discriminate the several modes of the system. The connecting taps $T_1$ to $T_n$ can be arranged at different distances with various impedances therebetween such that by selectively connecting the connecting element 12 between an associated connecting tap and the output terminal one of the several modes can be distinguished and selected.

In addition, according to the present invention, the output voltage, which corresponds to the impedance elements and the position of the rotating cam switch, is compared with reference data previously set in the microcomputer to discern between the various modes of the system.

Moreover, as only a single output port is employed, erroneous components are decreased due to the reduced number of ports, and the entire construction of the device is also simplified accordingly.

Although the present invention has been described with respect to the specified example, it will be apparent to those of ordinary skill in the art that various modifications and changes can be made without departing from the spirit and scope of the invention. Particularly, in the aforementioned description, the output terminal includes a number of distinct branches permitting selective connection with the connector, but the output terminal may be in a form of a circle so that the connector will be perpendicularly connected to one side of the output terminal. In addition, the pattern of the connecting tap and the connector may be changed to suit a particular application.

What is claimed is:

1. A mode discriminating device for an image signal processing system which has at least two processing system operating modes comprising:

a power source providing a supply voltage;

a cam switch having a connecting element, wherein said cam switch and said connecting element are selectively rotatable to any one of a predetermined number of positions, said connecting element comprising a single connector;

a voltage divider comprising:
an input terminal coupled to said supply voltage;
a plurality of impedance elements coupled to said input terminal for dividing said supply voltage;
a plurality Of connecting taps each disposed between adjacent ones of said impedance elements, said connecting element being rotated so as to selectively connect to a discrete one of said connecting taps and as said connecting element is rotated, to generate a plurality of discrete output voltages that correspond to said connecting taps, each respective output voltage corresponding to said supply voltage divided by a respective predetermined impedance, each said predetermined impedance corresponding to the position of said cam switch and connecting element;

an output terminal receiving said output voltages; and a microcomputer, for discriminating among the operating modes of the image signal processing system on the basis of the received output voltages.

2. The mode discriminating device for an image signal processing system as defined in claim 1, wherein said connecting element is arranged in said cam switch.

3. The mode discriminating device for an image signal processing system as defined in claim 1, wherein said connecting element is composed of a resilient material.

4. The mode discriminating device for an image signal processing system as defined in claim 1, wherein said output terminal is circular in form.

5. The mode discriminating device for an image signal processing system according to claim 1, wherein said microcomputer comprises:

an analog to digital converter for converting said output voltage from said voltage divider into a digital signal; and a mode discriminator for comparing said digital signal with a plurality of predetermined reference data to discriminate between one of said modes of the system.

6. The mode discriminating device for an image signal processing system as defined in claim 1, wherein said output terminal comprises a plurality of branches each terminating in a node lying a predetermined radial distance from a central point of said output terminal, said output terminal being connected to respective predetermined points of said voltage divider by said connecting element so as to produce a respective plurality of output voltages at said output terminal.

7. A mode discriminating device for an image signal processing system which has at least two processing system operating modes, comprising:

a cam switch having a predetermined number of contacts at respective predetermined positions comprising:

a single connector selectively rotatable between any one of said number of predetermined positions to engage a single one of said contacts;

a multi-tap voltage divider network receiving a supply voltage at an input terminal for producing said number of respective output voltages, each of said output voltages being discrete and corresponding to one of said operating modes; and an output terminal providing a selected one of said output voltages; and a microcomputer for discriminating between the operating modes of the image signal processing system on the basis of the selected one of said output voltages, said microcomputer comprising:

a converter receiving said selected one of said output voltages for generating a digital signal; and a mode discriminator for comparing said digital signal with a plurality of predetermined reference data to thereby identify one of said operating modes.

8. The mode discriminating device of an image signal processing system as defined in claim 7, wherein said output terminal is circular.

9. The mode discriminating device for an image signal processing system according to claim 7, wherein said output terminal comprises a plurality of branches each terminating in a node lying a predetermined radial distance from a central point of said output terminal.

10. A method for discriminating between processing system operating modes during operation of an image signal processing system having at least two distinct processing system operating modes, said image signal processing system including a cam switch positioning a single connecting element to be conductively disposed between each multiple taps of a voltage divider network and a common output connector, the output connector being coupled to a respective input terminal of a microcomputer so as to permit reception of a plurality of predetermined output voltages produced by the voltage divider network, said method comprising the steps of:

(a) generating one of said predetermined output voltages based on position of said connecting element; and (b) identifying actual processing system operating mode of said system corresponding to said position of said connecting element based on magnitude of a respective one of said predetermined output voltages.

11. The method as recited in claim 10, wherein said step (b) comprises the steps of:

(c) converting said respective one of said predetermined output voltages to a corresponding digital value;

(d) repeatedly comparing said digital value to a plurality of prestored digital values, each of said prestored digital values corresponding to both a respective one of said predetermined output voltages and a respective one of said operating modes; and (e) when a match is found between said digital value and one of said prestored digital values, identifying said actual operating mode responsive to said match.

* * * * *